United States Patent
Yu

(10) Patent No.: US 6,739,656 B2
(45) Date of Patent: May 25, 2004

(54) BASE OF BICYCLE SADDLE

(76) Inventor: Tsai-Yun Yu, No. 1-2, Lane 1147, Sec. 1, Chung San Rd., Tai Chia Chen, Taichung Hsien (TW)

( * ) Notice: Subject to any disclaimer, the term of this patent is extended or adjusted under 35 U.S.C. 154(b) by 7 days.

(21) Appl. No.: 09/986,337

(22) Filed: Nov. 8, 2001

(65) Prior Publication Data

US 2003/0042770 A1 Mar. 6, 2003

(30) Foreign Application Priority Data

Sep. 5, 2001 (TW) ..................................... 90215185 U

(51) Int. Cl.[7] .................................................. B62J 1/26
(52) U.S. Cl. .................. 297/215.16; 297/201; 297/202; 297/197
(58) Field of Search .......................... 297/215.16, 201, 297/202, 197

(56) References Cited

U.S. PATENT DOCUMENTS

| | | | | |
|---|---|---|---|---|
| 524,068 A | * | 8/1894 | Morrow .................... 297/197 |
| 543,260 A | * | 7/1895 | Mesinger .................. 297/197 |
| 558,917 A | * | 4/1896 | Granger ..................... 297/197 |
| 571,388 A | * | 11/1896 | Page ........................ 297/202 |
| 578,426 A | * | 3/1897 | Smith ....................... 297/197 |
| 620,946 A | * | 3/1899 | Meisselbach et al. ....... 297/202 |
| 635,598 A | * | 10/1899 | Rowe ........................ 297/201 |
| 672,656 A | * | 4/1901 | Tillinghast ............. 297/197 X |
| 2,149,247 A | * | 2/1939 | Mesinger .................... 297/197 |
| 5,165,752 A | * | 11/1992 | Terry ..................... 297/202 X |
| 5,340,192 A | * | 8/1994 | Hsh .......................... 297/197 |
| 5,356,198 A | * | 10/1994 | Hughes ............. 297/215.16 X |
| 5,387,024 A | * | 2/1995 | Bigolin ............. 297/215.16 X |
| 5,397,162 A | * | 3/1995 | Huang ............... 297/215.16 X |
| 5,558,396 A | * | 9/1996 | Yu ......................... 297/197 X |
| 6,095,601 A | | 8/2000 | Yu ........................ 297/215.16 |
| 6,113,184 A | * | 9/2000 | Barnes .................. 297/197 X |

* cited by examiner

*Primary Examiner*—Peter M. Cuomo
*Assistant Examiner*—Rodney B. White
(74) *Attorney, Agent, or Firm*—Browdy and Neimark, P.L.L.C.

(57) ABSTRACT

A base of a bicycle saddle comprises a main body made of a rigid plastic material. The main body is provided with at least one receiving space corresponding in location to the sitting area of bicyclist and a plurality of supporting bars suspended in the receiving space and defining a plurality of hollows. The base further comprises an elastic body made of a plastic material having a hardness smaller than the hardness of the plastic material of which the main body is made. The elastic body is filled in the receiving space by molding such that the hollows are enclosed by the elastic body, and the elastic body is firmly connected to the main body.

9 Claims, 8 Drawing Sheets

BASE OF BICYCLE SADDLE

FIELD OF THE INVENTION

The present invention relates generally to a bicycle saddle, and more particularly to a base of the bicycle saddle, which provides a comfortable feeling to the bicyclist when the bicyclist sits on the saddle.

BACKGROUND OF THE INVENTION

The conventional bicycle saddle is generally comprised of a rigid base disposed at the bottom side of the saddle, a middle layer made of a foam material and bonded to the top side of the base, and a soft covering layer covered on the middle layer. In addition to the shock absorbing means disposed between the saddle and the seat post of the bicycle, the middle layer of the saddle provides a cushion to buffer the pressure from the bicyclist. Since the base is adapted to support the whole structure of the saddle and acts as a bridge to connect the seat post, it must have certain hardness. In early days, the base is made of metallic material. Nowadays, rigid plastic material is commonly used for the base. Although the rigid base is covered by the middle layer of the foam material, the bicyclist still feels uncomfortable after a long riding. U.S. Pat. No. 6,095,601 discloses an improved base of a bicycle saddle, the base comprises a main body made of a rigid plastic material and provided in the rear portion thereof with two receiving spaces, and an elastic body made of a plastic material which is less rigid than the plastic material of which said main body is made. The elastic body is filled in said receiving spaces by molding so as to provide a shock-absorbing area corresponding in location to the buttocks of a bicyclist, thereby making the saddle rather comfortable to sit on.

The base disclosed in the above U.S. patent has drawbacks. When the bicyclist sits on the saddle, the elastic body is forced to curve inwards, becoming unable to support the bicyclist positively in position. Further, because the elastic body is a sheet-like body and the periphery thereof is fastened to the periphery of the receiving spaces, the center area of the elastic body is suspended from the main body. Therefore, the elastic body tends to be deformed, broken or detached from the main body after long time use.

SUMMARY OF THE INVENTION

The primary objective of the present invention is to provide a base of a bicycle saddle free from the drawbacks of the prior art described above, i.e. it makes the bicycle saddle rather comfortable to sit on.

It is another objective of the present invention to provide a base of a bicycle saddle to solve the broken and/or detached problems of the elastic body, thereby making the saddle rather durable in use.

In keeping with the principle of the present invention, the foregoing objectives of the present invention are attained by an improved base of a bicycle saddle, said base comprises a main body made of a rigid plastic material. The main body is provided with at least one receiving space corresponding in location to the sitting area of bicyclist and a plurality of supporting bars suspended in the receiving space and defining a plurality of hollows. The base further comprises an elastic body made of a plastic material having a hardness smaller than the hardness of the plastic material of which the main body is made. The elastic body is filled in the receiving space by molding such that the hollows are enclosed by the elastic body, thereby providing a suitable hardness in the receiving space of the main body so as to make the saddle rather comfortable to sit on. In addition, the elastic body is held in the main body by the supporting bars, thereby preventing the break or detachment of the elastic body.

DETAILED DESCRIPTION OF THE INVENTION

Figure 1:
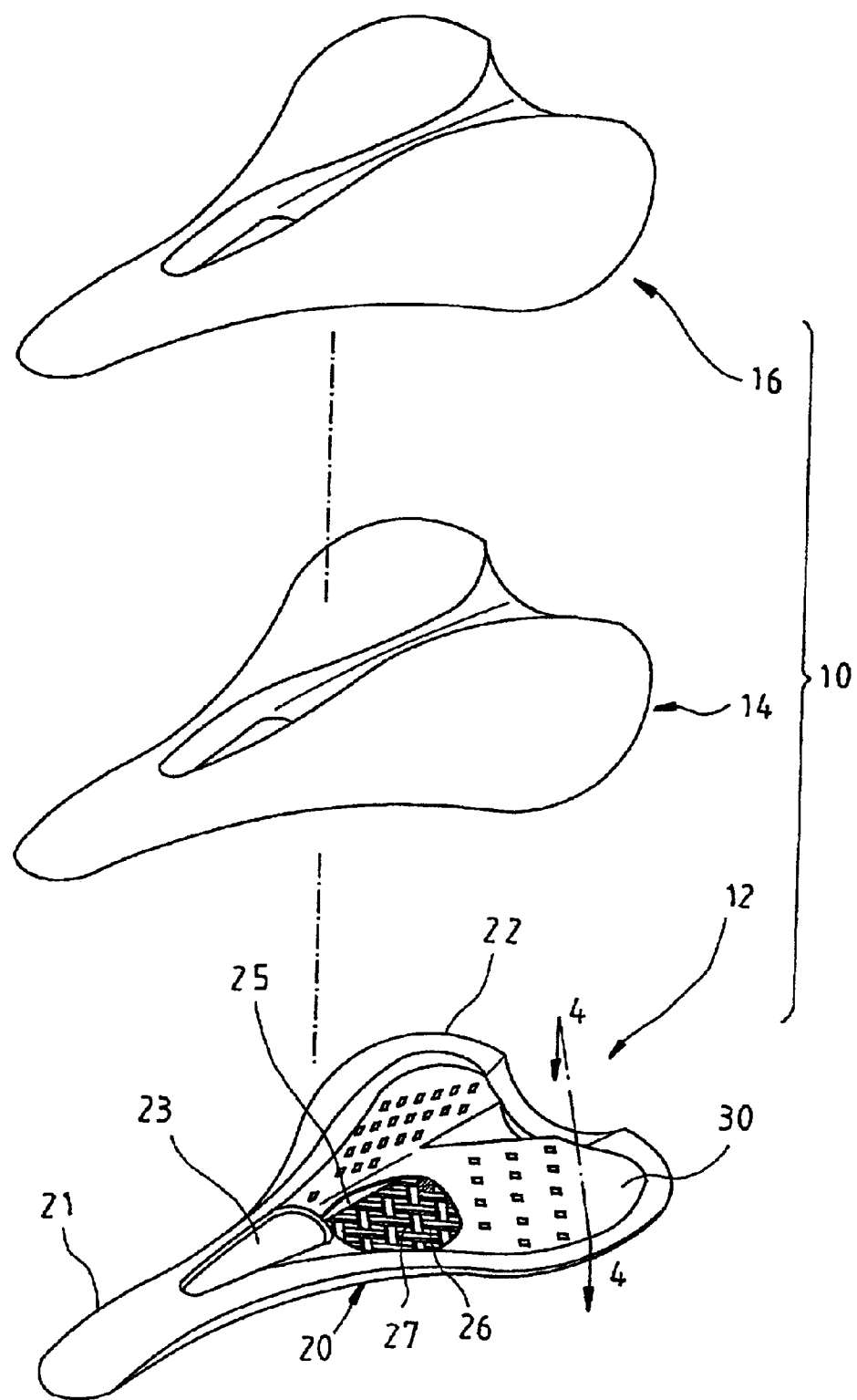
FIG. 1 shows an exploded view of a bicycle saddle containing a first preferred embodiment of the present invention.

As shown in FIG. 1, a bicycle saddle 10 is formed of a base 12, a middle layer 14 made of a foam material which is bounded on the top side of the base 12, and an outer covering layer 16 covered on the middle layer 14.

Figure 2:
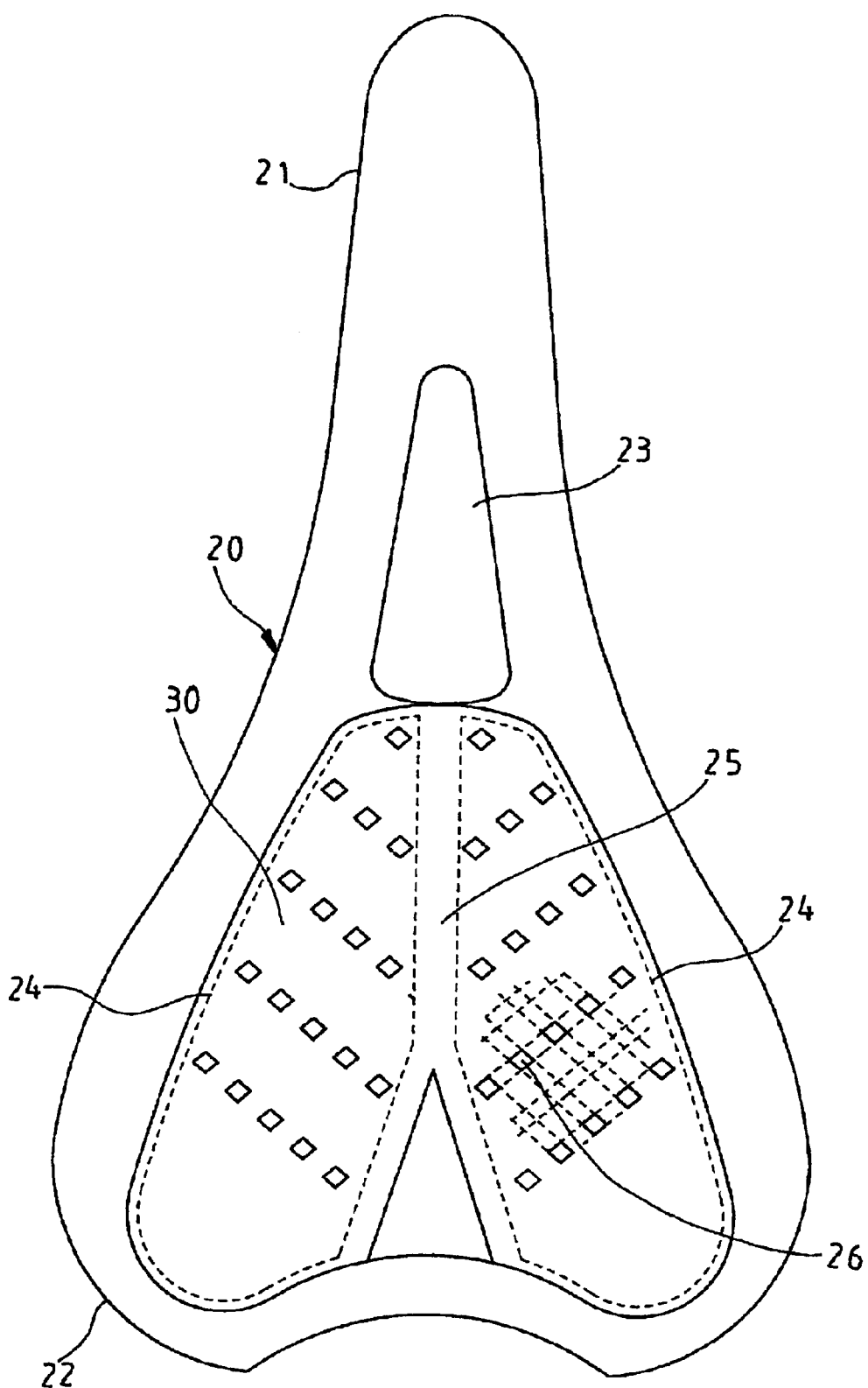
FIG. 2 shows a top view of the first preferred embodiment of the present invention.
Figure 3:
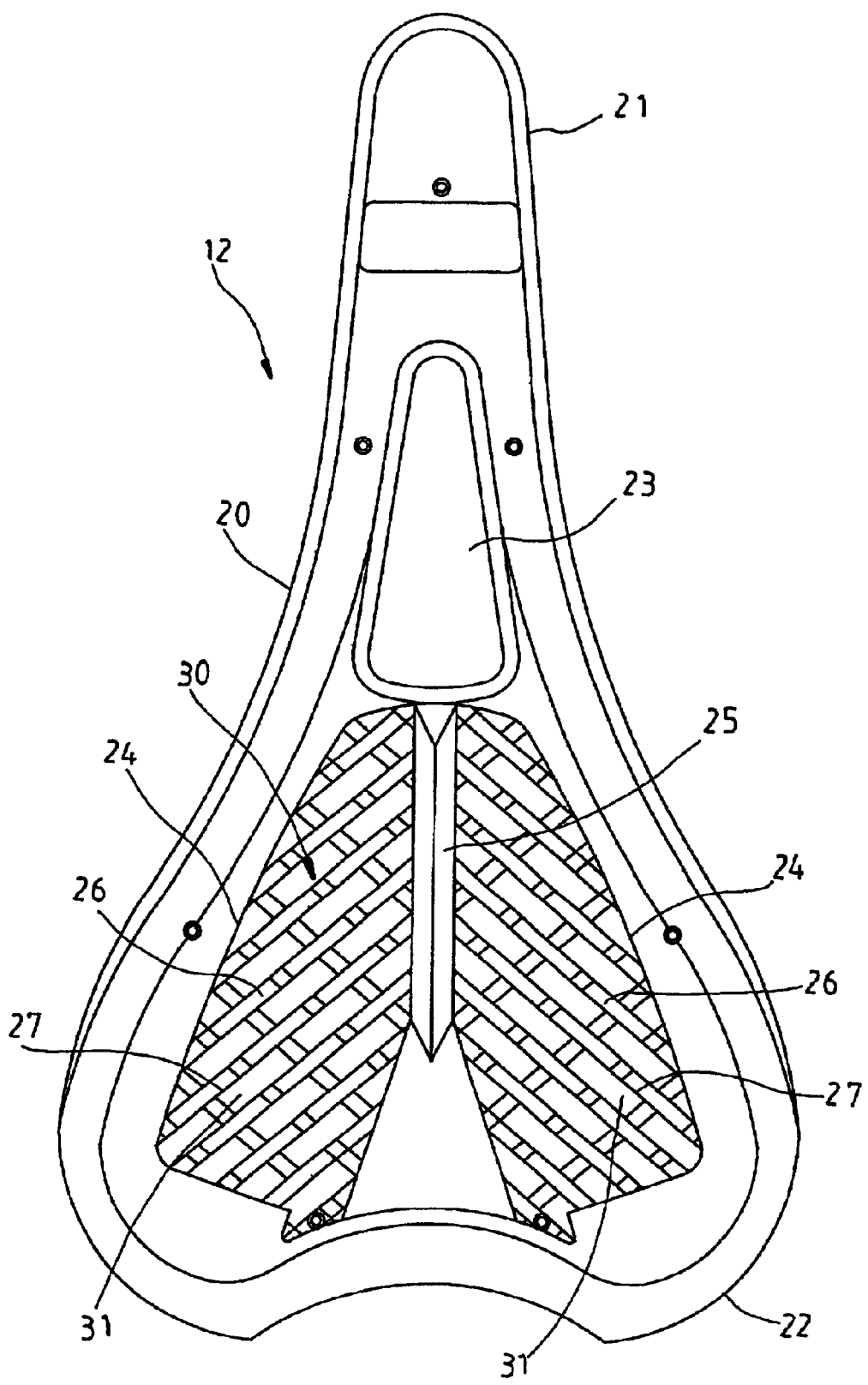
FIG. 3 shows a bottom view of the first preferred embodiment of the present invention.
Figure 4:
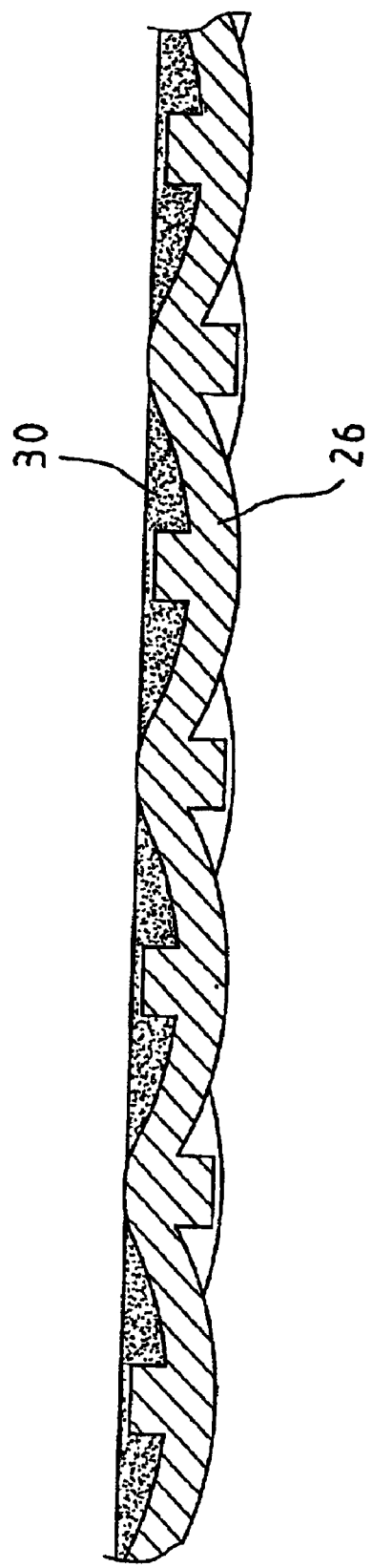
FIG. 4 shows a sectional view taken along the direction indicated by a line 4—4 as shown in FIG. 2.

As shown in FIGS. 2–4, the base 12 of the first preferred embodiment of the present invention comprises a main body 20 and an elastic body 30.

The main body 20 is made of a rigid plastic material by molding. Similar to a conventional bicycle saddle, the main body 20 has a triangular shape with a narrower front portion 21 and a relatively wider rear portion 22. The main body 20 is provided with a opening 23 longitudinally extended in the direction from the front portion 21 toward the rear portion 22, two receiving spaces 24 symmetrically disposed in the rear portion 22 of the main body 20 within the area between the opening 23 and the rear end of the rear portion 22 corresponding in location to the bicyclist's hips, a longitudinal rib 25 longitudinally extended from the rear side of the opening 23 to the rear end of the rear portion 22 within the area between the two receiving spaces 24, and a plurality of supporting bars 26 suspended in the receiving spaces 24. The rib 25 and the supporting bars 26 are formed integral with the main body 20 upon molding of the main body 20.

As shown in FIG. 3, the supporting bars 26 form a meshed structure, i.e., a part of the supporting bars 26 extended obliquely leftwards in parallel and the other supporting bars extended obliquely rightwards over the foregoing supporting bars such that a plurality of parallelogram hollows 27 are defined by these supporting bars 26. As shown in FIG. 4, the interconnected portions of the supporting bars 26 are alternatively overlapped one another such that the supporting bars 26 are formed as a cubic knitlike mesh.

The elastic body 30 is directly molded from rubber or the like of hardness lower than the main body 20 on the longitudinal rib 25 and the supporting bars 26 to fill up the receiving spaces 24, keeping in flush with the top surface of the main body 20. The elastic body 30 is bonded to the periphery of each receiving spaces 24 and covered over the rib 25 and the supporting bars 26 to fill up the hollows 27 (leaving a part of the supporting bars 26 to be seen from the top side of the main body 20). When viewed from the bottom side, the bottom side of the elastic body shows meshed-like filling blocks 31.

According to the aforesaid structure, the elastic body 30 and the rigid supporting bars 26 are bonded together in the sitting area of the base 12, namely, the receiving spaces 24. Therefore, the sitting area is relatively softer and more flexible than a rigid plastic base, however it is not excessively soft, i.e., the base 12 has the desired softness and hardness. When installed in the saddle 10, the base 12 supports the saddle 10 in shape and buffers the pressure from the bicyclist, enabling the bicyclist to have a comfortable riding.

Further, because the periphery and center area of the elastic body 30 are respectively bonded to the main body 20 and the supporting bars 26, the connection between the main body 20 and the elastic body 30 is positive. When pressed, downward pressure is evenly distributed through the supporting bars 26, and therefore the elastic body 30 does not break or detach.

Figure 5:
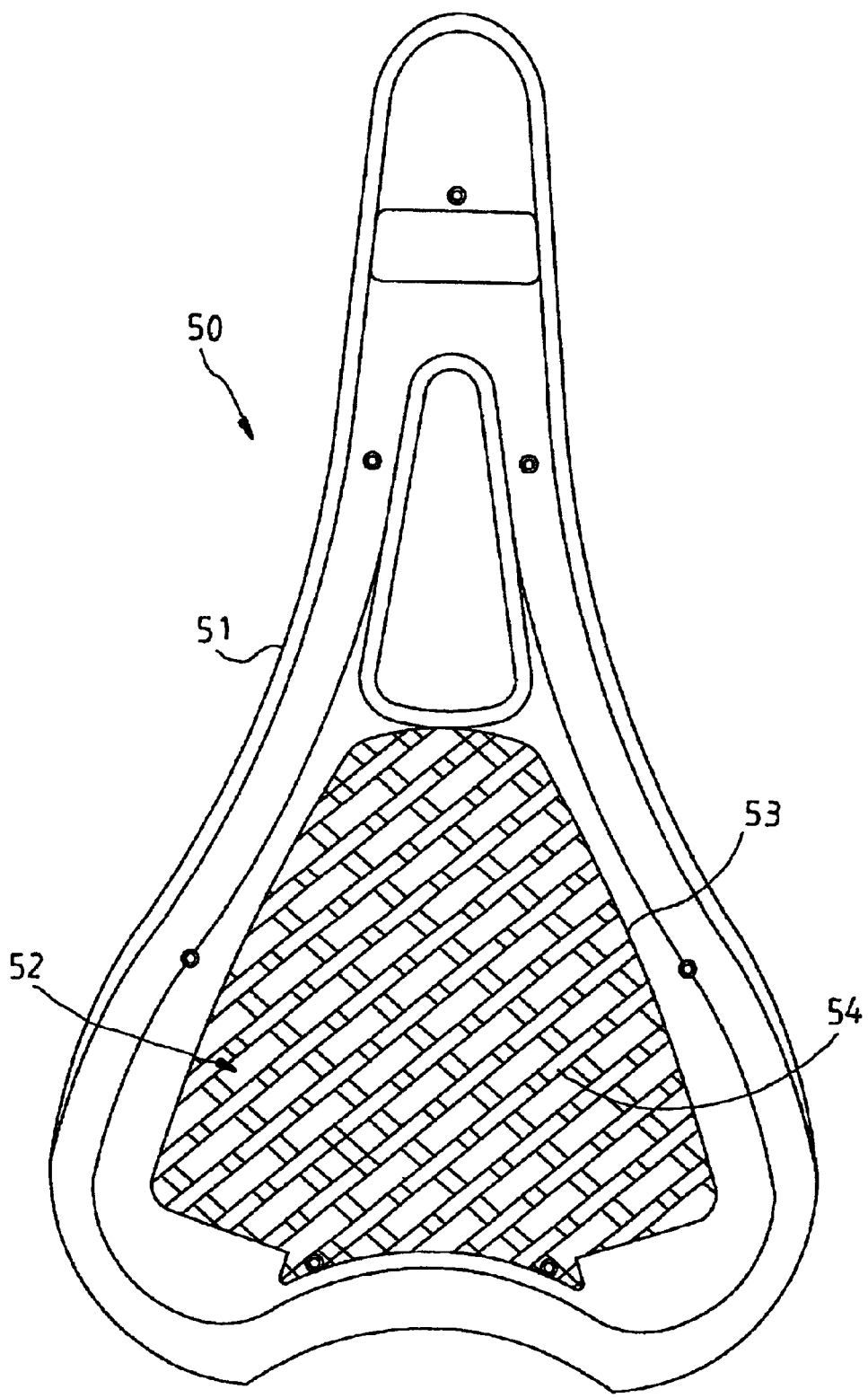
FIG. 5 shows a bottom view of a second preferred embodiment of the present invention.

FIG. 5 shows a second preferred embodiment of the present invention. According to this embodiment, the base 50 comprises a rigid main body 51 and an elastic body 52. The main body 51 has only one receiving space 53 disposed in the rear portion thereof corresponding in location to the bicyclist's hips, and meshed supporting bars 54 suspended in the receiving space 53. The elastic body 52 is directly molded from rubber on the supporting bars 54 to fill up the receiving spaces 53.

Figure 6:
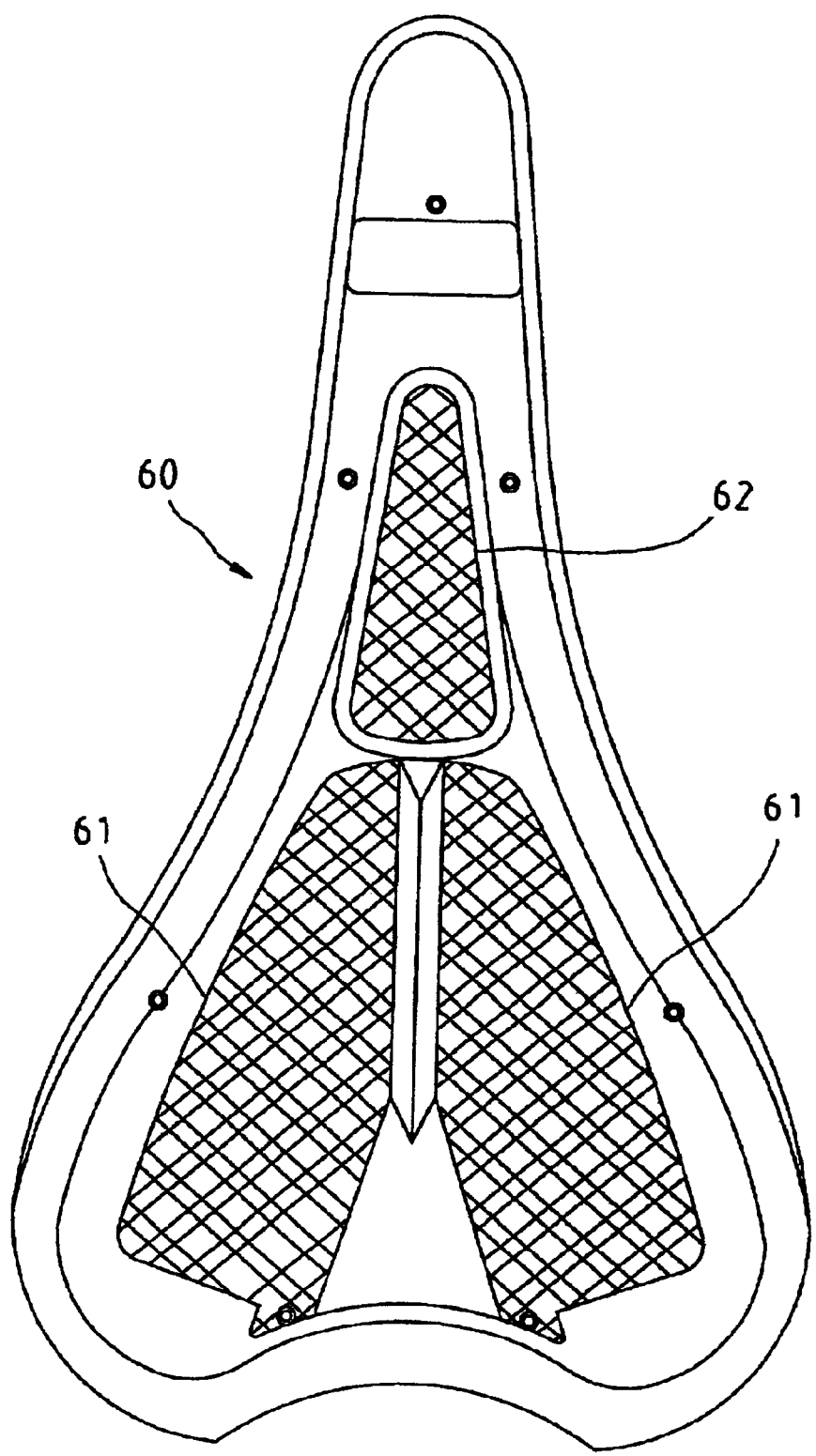
FIG. 6 shows a bottom view of a third preferred embodiment of the present invention.

FIG. 6 shows a third preferred embodiment of the present invention. According to this embodiment, the base 60 has two rear receiving spaces 61 bilaterally symmetrically disposed near the rear side and a front receiving space 62 disposed on the middle portion of the base in front of the rear receiving spaces 61. The receiving spaces 61 and 62 can be filled up with one single elastic body, or alternatively filled up with a respective elastic body.

Figure 7:
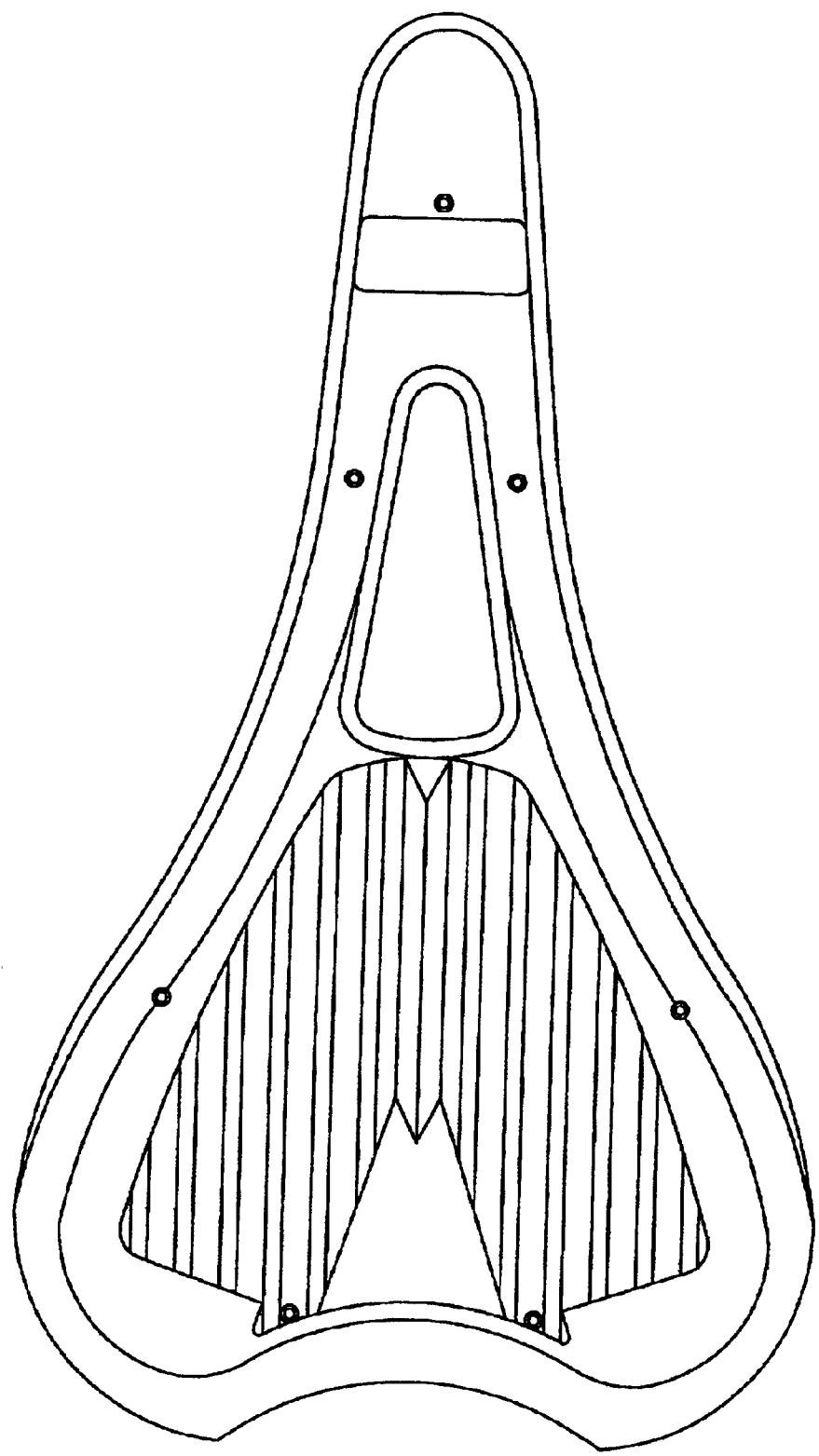
FIG. 7 shows a bottom view of a fourth preferred embodiment of the present invention.

Further, the supporting bars are not limited to the meshed structure as shown in the aforesaid embodiments. In the fourth preferred embodiment of the present invention as shown in FIG. 7, the supporting bars 72 are arranged in parallel in the receiving space 71 of the base 70, defining a plurality of elongated hollows 73. The supporting bars 72 can be extended in longitudinal direction as shown in FIG. 7. Alternatively, the supporting bars 72 can be extended in transverse direction, or obliquely leftwards or rightwards.

Figure 8:
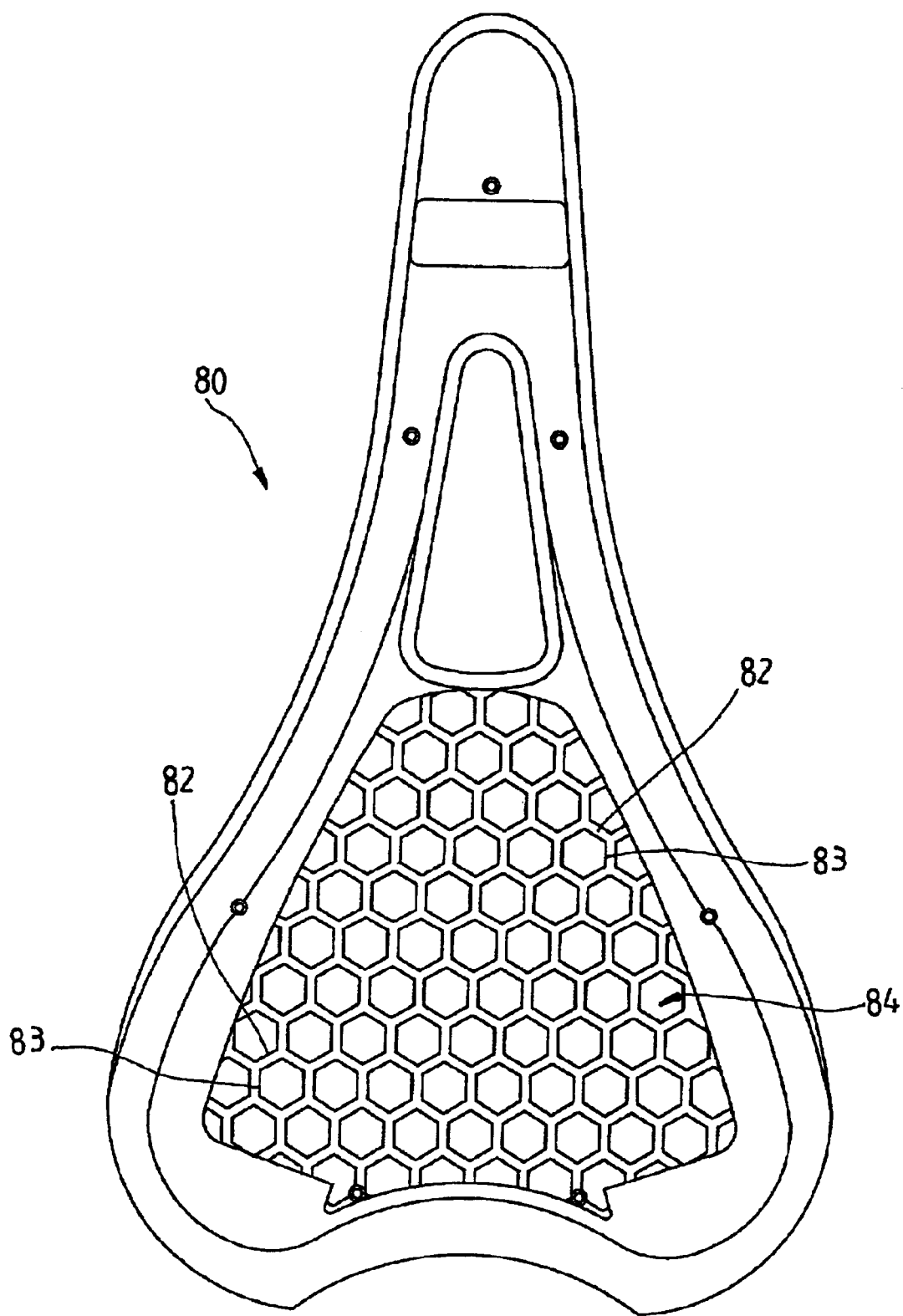
FIG. 8 shows a bottom view of a fifth preferred embodiment of the present invention.

According to the fifth preferred embodiment of the present invention as shown in FIG. 8, the supporting bars 82 in the receiving space 81 form a cellular structure defining a plurality of hexagonal hollows 83, and the elastic body 84 is bonded to the periphery of the receiving space 81 and the supporting bars 82 to fill up the hollows 83. Alternatively, the supporting bars 82 can be arranged so that circular, rectangular, or different shapes of hollows are defined within the receiving space in the sitting area of the base.

Although particular embodiments of the invention has been described in detail for purposes of illustration, various modifications and enhancements may be made without departing from the spirit and scope of the invention. Accordingly, the invention is not to be limited except as by the appended claims.

What is claimed is:

1. A base of a bicycle saddle, said base comprising:

a main body made of a rigid plastic material and provided with a narrow front portion, a wide rear portion, at least one receiving space disposed only in the rear portion corresponding in location to the sitting area of a bicyclist, and a plurality of supporting bars each of which is engaged in and crosses over said receiving space define a plurality of hollows between the supporting bars in said receiving space;

wherein the supporting bars are formed integrally with the main body, and at least one elastic body made of a plastic material of a hardness smaller than the hardness of the plastic material of which said main body is made, said elastic body being bonded to the periphery of said receiving space and to the supporting bars in said receiving space by molding, such that the hollows are filled with said elastic body so that said supporting bars and said elastic body are interconnected.

2. The base as defined in claim 1, wherein said main body has two receiving spaces separated by a longitudinal rib formed integral with said main body, said two receiving spaces respectively disposed in said rear portion.

3. The base as defined in claim 2, wherein said main body further comprises a third receiving space disposed in a middle portion of the main body in front of said two receiving spaces.

4. The base as defined in claim 1, wherein said main body includes only one receiving space disposed in the rear portion covering a left and a right side of the rear portion.

5. The base as defined in claim 4, wherein said main body further comprises a second receiving space disposed in a middle portion of the main body in front of said one receiving space.

6. The base as defined in claim 1, wherein said supporting bars form a meshed structure having said hollows defined therein.

7. The base as defined in claim 6, wherein the supporting bars are alternatively overlapped one another.

8. The base as defined in claim 1, wherein said supporting bars are arranged in parallel so as to define elongated hollows in parallel.

9. The base as defined in claim 1, wherein said supporting bars form a cellular structure having said hollows defined therein.

* * * * *